W. P. THOMAS.
FRUIT GRADER AND SIZER.
APPLICATION FILED JULY 1, 1919.

1,326,117.

Patented Dec. 23, 1919.
3 SHEETS—SHEET 1.

WITNESSES

INVENTOR
WION P. THOMAS
BY
ATTORNEYS

W. P. THOMAS.
FRUIT GRADER AND SIZER.
APPLICATION FILED JULY 1, 1919.

1,326,117.

Patented Dec. 23, 1919.
3 SHEETS—SHEET 2.

WITNESSES

INVENTOR
WION P. THOMAS
BY
ATTORNEYS

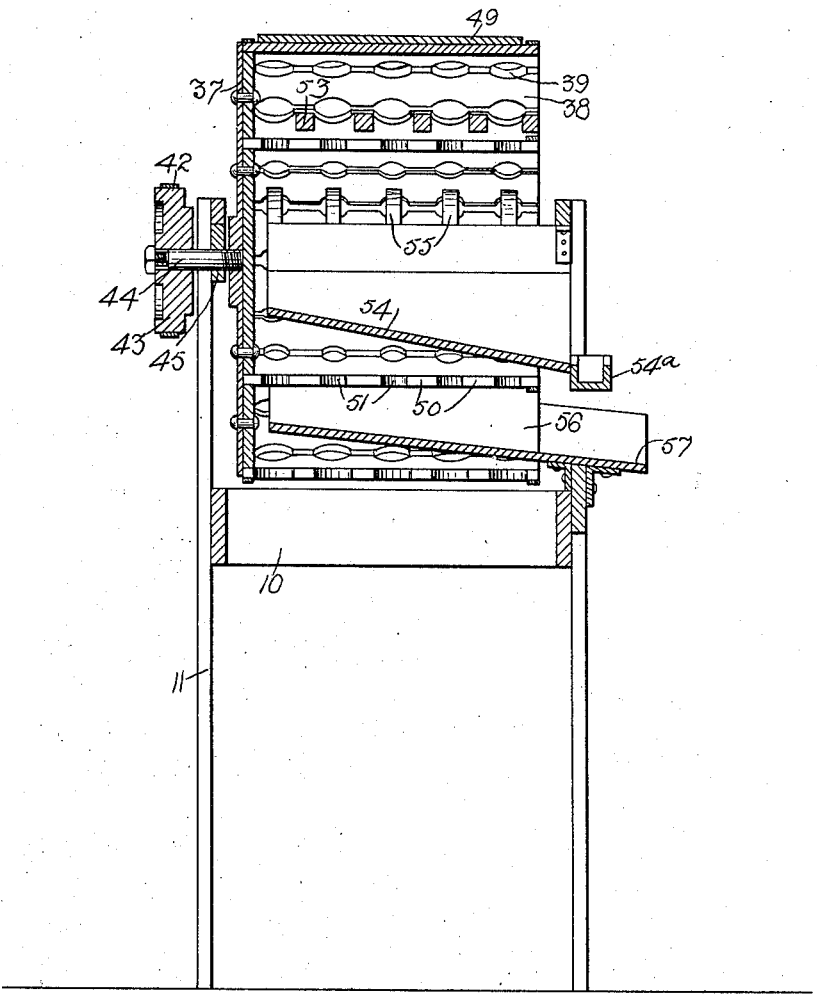

UNITED STATES PATENT OFFICE.

WION P. THOMAS, OF KENT, NEW YORK.

FRUIT GRADER AND SIZER.

1,326,117.  Specification of Letters Patent.  Patented Dec. 23, 1919.

Application filed July 1, 1919. Serial No. 307,971.

*To all whom it may concern:*

Be it known that I, WION P. THOMAS, a citizen of the United States, and a resident of Kent, in the county of Orleans and State of New York, have invented a new and Improved Fruit Grader and Sizer, of which the following is a description.

My invention relates to grading and sizing machines for apples and other fruits and useful also in sorting potatoes and similar vegetables.

The general object of my invention is to provide a machine improved in various particulars especially with respect to reliability of the separating and conveying means and also to the end that the structure will be compact and of a simple form so easily operated as to permit of the employment of manually operable actuating means and possessing various distinctive characteristics and advantages among which are the following: Supported by the framework is a hopper at a low elevation for promoting convenience, the hopper serving to conduct the fruit to the foot of the elevator; in connection with the hopper a manually controlled gate of novel form and arrangement is provided that is effective in causing the apples or other fruits to arrange themselves in a single layer in approaching the elevator; the elevator boot and adjacent parts afford clearance for the operation and movement of the elevator belt and slats but prevent the entrance to the boot of the better grades of fruit with the liability of injuring the latter, and the fruit is caused to be so positioned as to be properly taken up by and seated on the slats; the elevator slats and coacting parts of the elevator are so formed as to minimize the possibility of fruit falling therefrom when being elevated; the elevator at the top is so arranged that as a loaded slat approaches the top and starts to turn, the fruit rolls over a transverse incline to the opposite side of the elevator on its way to the separating means and the slats are relatively so arranged that as fruit rolls over the incline, the adjacent descending slat will bridge the space between the elevator structure and the feed board leading to the sizing means so as to pass the fruit from the incline to said feed board; a sizing means is employed in the form of a wheel having concentric separating rims with guide means and other necessary appurtenances, from which the superior grade of fruit is discharged to a sorting table at a convenient elevation, all as will more clearly appear from the specific description following.

Reference is to be had to the accompanying drawings forming a part of this specification, it being understood that the drawings are merely illustrative of one example of the invention.

Fig. 3 is a transverse vertical section on the line 3—3, Fig. 1.

Figure 1:
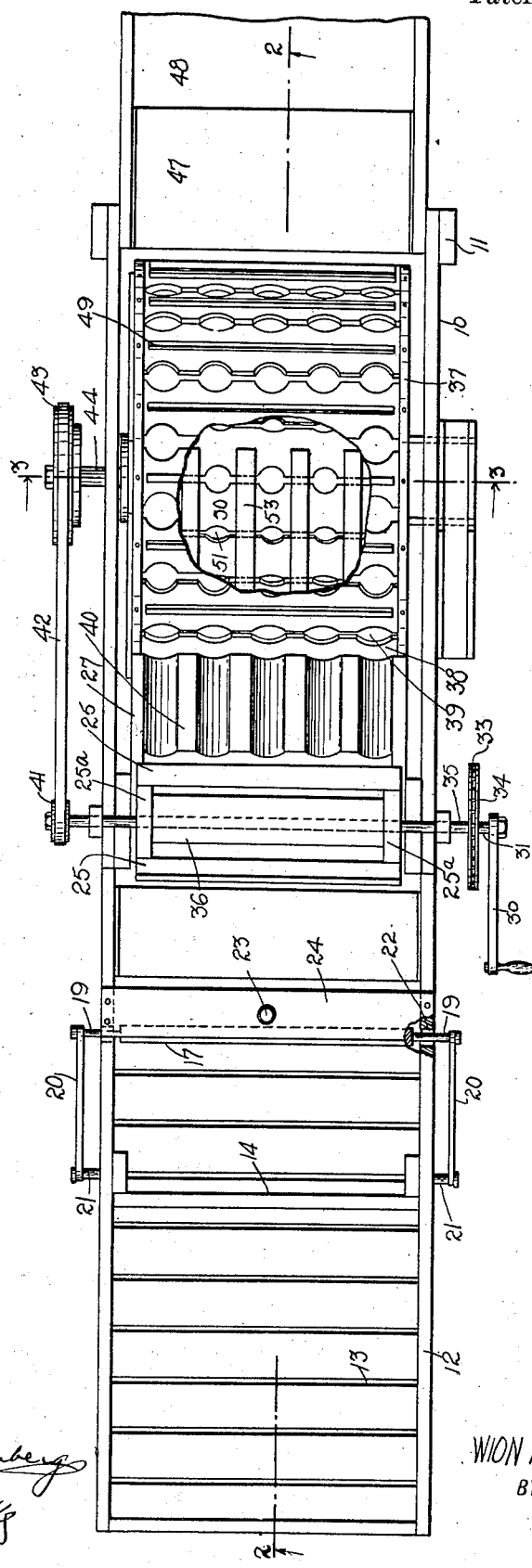
Figure 1 is a plan view of a machine embodying my invention, parts being broken away.

In carrying out my invention in practice, a frame 10 of suitable construction is provided, here shown as supported on legs 11. Supported at one end of the frame is a hopper 12 to receive the fruit and the bottom of the hopper is inclined and may, as shown, be formed of slats presenting intervening spaces 13 for the escape of dirt. In the hopper and above the bottom is a transverse splash board 14 beneath which the fruit passes on its way to the boot 15 of an elevator 16. In the hopper between the splash board and the elevator is a controlling gate 17 having a cushioning 18 to prevent damage of the fruit, and said gate is arranged to permit it to adjust itself to assume a position varying in accordance with the irregularities of the fruit therebeneath, for which purpose the gate has trunnions 19 projecting through the sides of the frame, said trunnions being pivotally connected at one end with links 20 at one end of the latter, said links being pivoted on studs 21 or the like on the frame. The pivoting of the links and their loose connection with the trunnions 19 permit either side of the gate to rise to assume a higher or lower level relatively to the opposite end, the trunnions having clearance in slots 22 in the sides of the frame. The gate is manipulated and controlled by an upstanding handle 23 which extends therefrom through a crosspiece 24 on the frame to a convenient height above the hopper for the operator to grasp the handle.

Figure 2:
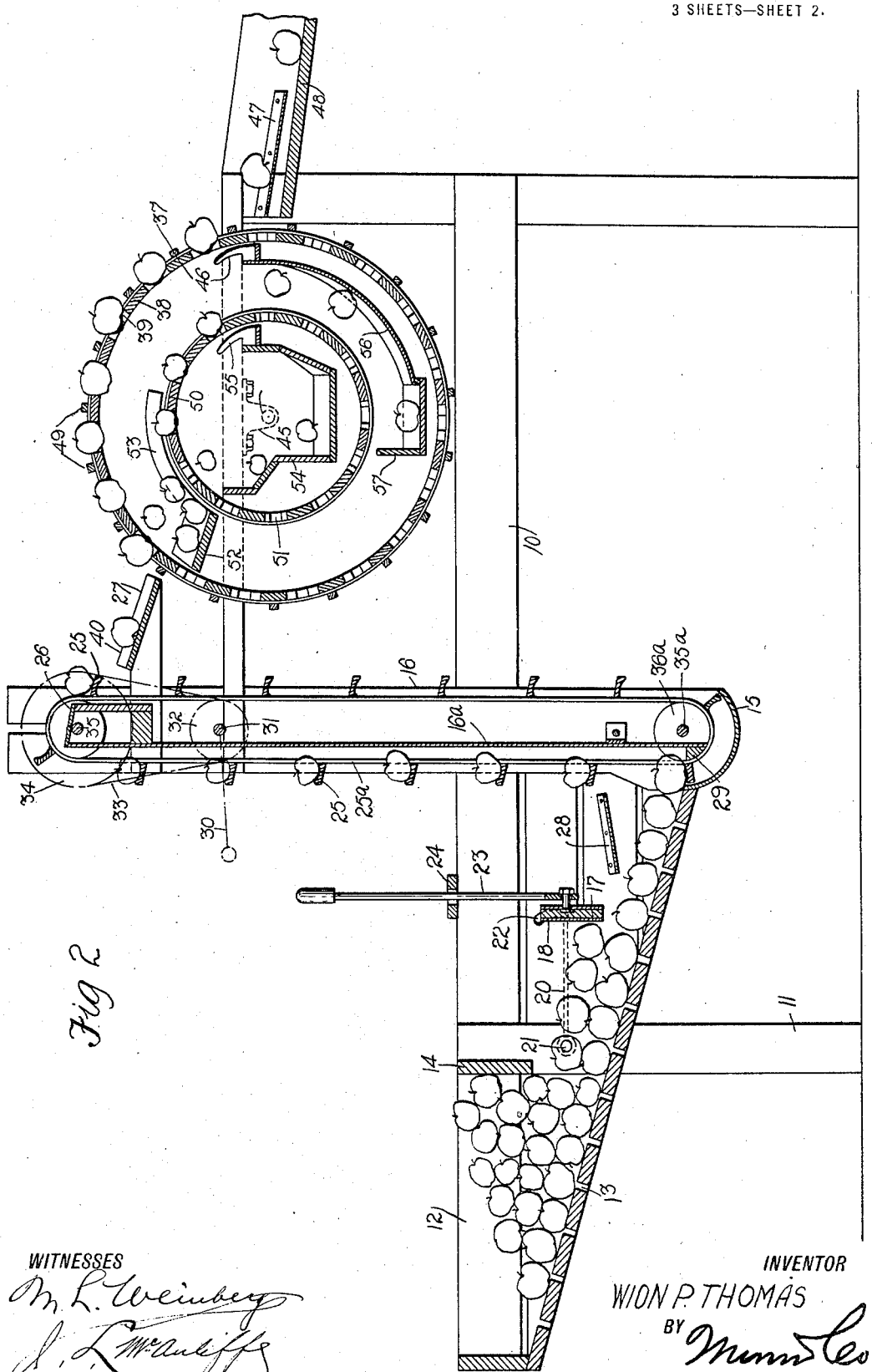
Fig. 2 is a longitudinal vertical section on the line 2—2, Fig. 1.

The elevator 16 while possessing features capable of a more general use has particular advantages in connection with the relative positions of the hopper and the sizing means hereinafter described and especially with respect to being of a construction and arrangement permitting of the elevator being vertically disposed whereby to enable the hopper and sizing means to be positioned in adjacent vertical planes so that a machine of minimum length results. Said elevator comprises an endless belt 25ᵃ provided with slats 25 on the face thereof, the slats being hollowed out or troughed and at an angle to the belt to present a transverse rearward dip in ascending, whereby the trough form and the inclination serve to dispose the fruit, as will be clear from Fig. 2, in a manner that will prevent the seated fruit from falling from a slat over the front edge thereof. To further decrease the possibility of the fruit falling in case one should be carried upward resting another seated on a slat, an upright wall 16ᵃ is provided on the elevator at the back of the ascending run of the belt against which wall fruit may lean in ascending. Should any fruit fall, it will drop to a transverse strip of any suitable flexible material which, as indicated at 28, is disposed in the hopper 12 above the bottom thereof and is inclined to gently return the fruit to the hopper bottom. At the top of the elevator the fruit rolling from a slat 25, as the latter starts to turn, passes transversely across the elevator to the opposite side, there being provided at the top of the elevator a transverse incline 26 dipping toward the descending run of the elevator. The slats are so spaced that as one starts to turn and assumes a position so that the fruit rolls therefrom to the incline 26, the preceding slat which has started to descend will be in a position to receive the fruit rolling from said incline, said descending slat in effect bridging the space between said incline, and a feed board 27 that directs the fruit to the sizing means. The incline 26 may be of any suitable soft material affording a cushion for the fruit. The boot 15 of the elevator is curved in consonance with the arcuate travel of the elevator belt and slats at the bottom of the elevator and presents a clearance space just sufficient for the slats, the space being insufficient for a better grade of fruit to find entrance thereto from the hopper 12. At the front of the wall 16ᵃ at its lower end is a transverse or equivalent spacing element 29 at the forward edge of the boot 15, the arrangement being such that the better grades of fruit will bridge the boot of the elevator and rest partially on said cleat in position to be properly engaged by the ascending slat.

The construction and arrangement of the moving parts of the machine are such as to permit of an easy operation so that manually operable means adapted to be operated even by a young boy or girl may be employed. In the illustrated example a crank handle 30 is provided on a transverse shaft 31 and at an elevation to be readily grasped by one hand of the attendant while the other hand grasps the gate handle 23. On the shaft 31 adjacent to each end is a pulley as indicated at 32, over which a belt or chain 33 runs, which runs also over a pulley 34 on a shaft 35 at the top of the elevator. Said shaft 35 has pulleys 36 over which the elevator belts 25ᵃ run, there being similar pulleys 36ᵃ at the lower end of the elevator on a shaft 35ᵃ.

The sizing wheel 37 has an outer rim preferably composed of slats 38 and presenting between said slats transverse rows of openings 39, here shown as five in number, the openings in the present instance being formed by producing opposite concave recesses in adjacent slats 38. Said openings are of a size to permit all but the largest fruit to pass therethrough and affording seats for the largest fruit so that it will be carried at the top of the wheel to the opposite side. The feed board 27 has parallel ridges 40 in line with the positions of the openings 39 for directing the fruit in single succession to the respective openings. The wheel at the periphery and between the rows of openings 39 may, as shown, have cleats 49 to aid in the picking up of the fruit by the wheel from the feed board. The wheel may be driven in any suitable manner, there being shown as an example drive means consisting of a pulley 41 on the shaft 35, a belt 42 running over said pulley and over a pulley 43 on a stud shaft or trunnion 44 rigid with the wheel 37 at one end and turning in a suitable bearing 45 in frame 10. Said bearing in practice is of a length to sustain wheel 37 for turning about a horizontal axis. As the fruit on the rim 38 arrives at the opposite side of the wheel, it will roll therefrom to a sheet 47 of any suitable flexible material. Any fruit failing to dislodge itself from the wheel to drop to the sheet 47 will be displaced by fingers 46 disposed at the interior of the wheel adjacent to the path of movement of the rim, the fingers corresponding in position with the holes 39. The wheel will have a plurality of rims depending on the number of sizes in which the fruit is to be separated, the arrangement shown providing for separation into three sizes and two rims therefore being provided. The inner rim 50 is in fixed relation to the outer rim and concentric therewith, said inner rim having holes 51 through which the smaller sizes may pass, while the larger sizes will seat on the rim at said openings. The fruit dropping through the openings 39 to the interior are received on a ledge 52 constituting a feed board between the two rims at the receiving side of the wheel. Said wheel is open at the side opposite the stud shaft 44 and that end of the feed board 52 adjacent to the open side of the wheel is suitably supported on the frame 10 so that the wheel rim is turned relatively to the feed board. Extending from the feed board 52 in arcuate form adjacent to the rim 50 are guide fingers 53 disposed in staggered relation to the holes 51 and serving to guide the fruit in single succession in accordance with the positions of said holes. Fruit falling through the openings 51 drops to an arcuate chute 56 supported at one end on the frame, said chute leading to a longitudinal chute 54 outside of the machine, so that the fruit is conducted out of the wheel and may be directed to any suitable receiver. The fruit carried on the wheel 51 approaching the opposite side from the feed board 52 drops from the wheel or will be displaced by fingers 55 in fixed position within the rim. The fruit as discharged from the wheel 50 drops to a sheet 56 of any suitable flexible material and rolls down the same to a chute 57 provided between the two rims and extending outward through the open side of the wheel. The fingers 46 are mounted preferably on the upper end of the arcuate chute 56. At all events they are supported, (see Fig. 2), adjacent to the approximate horizontal center of the wheel and extend upwardly therefrom, the front surface being curved upwardly and laterally inward to present with the inner surface of the outer rim a curvilinear angle. The described arrangement is effective in dislodging the fruit and at the same time minimizes the possibility of protruding fruit becoming jammed between the upper ends of the fingers 46 and the outer rim.

It will be readily appreciated from the foregoing that the particular elevator with the arrangement for transferring the fruit across the elevator at the top and the bridging of the space toward the feed board is incidental to the upright position of the elevator which position contributes materially to the reduced length of the machine and results in compactness as compared with an inclined elevator, the overhang of which provides for the ready discharge of the material from the elevator without the necessity for the transfer of the fruit across the elevator top and at the down side thereof as in my construction, but the inclined elevator possesses the disadvantage of increasing materially the total length of the machine. Moreover, with the upright elevator, the separating wheel is so positioned as to discharge the grades of fruit at convenient elevations, particularly the higher grades of fruit discharging to the sorting table. Also, the form and disposition of the slats is especially serviceable in the fruit grader in reducing the possibility of fruit falling from the slats.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a machine of the class described, a grading wheel mounted to turn about a horizontal axis and presenting rims separated from each other, holes in said rims permitting articles of predetermined sizes to pass therethrough and to provide seats for the articles failing to pass through the holes, the holes in the outer rim being the larger, means to deliver the articles to be graded to said wheel at one side and in position to be received by the openings of the outer rim, and means at the opposite side of said wheel between the inner and outer rims to receive the articles from the outer rim of the wheel, said last mentioned means consisting of an arcuate chute leading downwardly from the approximate horizontal center of the wheel; together with a chute leading laterally outward from the wheel at a side thereof and positioned to receive fruit from said arcuate chute.

2. In a machine of the class described, a grading wheel mounted to turn about a horizontal axis, an outer rim on said wheel and formed with openings through which articles less than a given size may pass, while the larger articles may seat on the rim at said openings, a second rim within and spaced from the outer rim and mounted to turn therewith, a feed board between the rims adjacent the feed side of the outer rim and adapted to receive articles passing through said outer rim, said inner rim having openings permitting articles of a given size to pass therethrough while affording seats for larger articles received by said rim, means within the inner rim to conduct out of the wheel the articles passing through said rim, and means between the rims adapted to receive and conduct out of the wheel the articles prevented from passing through the inner rim.

3. In a machine of the class described, a grading wheel, inner and outer rims thereon having openings to permit articles of given sizes to pass through the respective rims, the openings in the outer rim being the larger, a feed board between the rims at one side of the wheel and in fixed position, said feed board being adapted to receive articles passing through the outer rim, and curved guide fingers extending from said feed board partially about the inner rim at the top to cause the articles to pass from the feed board in single succession to the openings of the inner rim.

4. A machine of the class described, including a grader wheel presenting inner and outer rims formed with holes for the passage of articles of given sizes, the holes of the outer rim being the larger, means within the respective rims at the side opposite the receiving side and fixed adjacent to the inner peripheries of the rims for dislodging articles carried by the rims from one side of the wheel to the other at the openings therein, a chute disposed between said rims and extending from the approximate center of the wheel downwardly, said dislodging means being supported on said chute, and a second chute positioned to receive fruit from the first chute and arranged to conduct the received fruit out of the wheel.

5. In a machine of the class described, a hopper to receive articles to be graded and having an inclined bottom, a gate in said hopper movably mounted and adapted to dispose the articles to be graded in a single layer, an elevator at the foot of which the hopper discharges, a rotary grader adapted to receive the articles raised by the elevator, drive means for the elevator and grader, manually operable actuating means for said drive means, and a handle on said gate and extending upwardly therefrom adjacent to said actuating means so that an operator can with one hand grasp said handle for manipulating the gate and with the other hand operate said actuating means.

6. A fruit grader including a grader wheel presenting inner and outer spaced rims formed with holes for the passage therethrough of fruit of given sizes, the holes of the outer rim being the larger, and rigid fingers fixedly disposed within the outer rim at the delivery side thereof, said fingers being supported adjacent to the approximate horizontal center of the wheel and presenting front surfaces curving upwardly and laterally inward forming with the opposed inner surface of the outer rim curvilinear angles.

WION P. THOMAS.